UNITED STATES PATENT OFFICE.

PATRICK J. WALSH AND WILLIAM J. TAYLOR, OF OIL CITY, PENNSYLVANIA; SAID TAYLOR ASSIGNOR TO SAID WALSH.

IMPROVEMENT IN COMPOUNDS FOR THE MANUFACTURE OF BRICKS, TILES, &c.

Specification forming part of Letters Patent No. 172,357, dated January 18, 1876; application filed December 3, 1875.

*To all whom it may concern:*

Be it known that we, PATRICK J. WALSH and WM. J. TAYLOR, of Oil City, in the county of Venango and State of Pennsylvania, have invented certain new and useful Improvements in Composition for Bricks, Tiles, and other Articles of Pottery-Ware, of which the following is a specification:

This invention consists of a compound or composition of matter which, when suitably molded and baked, shall constitute a brick of either the ordinary clay or of fire-clay, or a tile or other article of pottery-ware. The methods of tempering the clay used in this compound, and of molding and burning said compound, do not differ from any present known approved modes, except as hereinafter mentioned.

The clay out of which the desired article, whether a brick, tile, or other article of pottery-ware, is to be made, being duly tempered, or in process of tempering, there is introduced in any convenient manner to the mass of said clay either raw coal-tar, or the liquid residua of the several kinds of coal-oil, such as petroleum or rock oil, or such other mineral oils by whatever name known to commerce, whether produced by nature or by art, said residua being the liquid remains of said oils after all their more highly volatile elements have been expelled by artificial means, by the application of heat.

The raw coal-tar, or the several residua above mentioned, are mixed with the particular clay used when being tempered, in the proportion of, say, one barrel of the fluid tar or residua to six thousand bricks of ordinary pattern, and in about the same proportion for other articles made of the same compound, the proper test of the proportion of said coal-tar or oil-tar being that the article, when baked, shall have the desired surface and fracture, and its edges strong and well defined. If too much coal-tar or oil-tar be used, the article will be too much burned in the kiln and spoiled. If too little coal-tar or oil-tar be used, the article will not be so strong when baked, nor will it have the qualities in its green state desirable for it to have, which qualities will now be stated:

The chief benefits derived from the use of the coal-tar or oil-tar in intimate mixture with the clay are these: the oily or tarry matter quickly permeates the mass of the clay and soon disintegrates any lumps of said material, rendering the process of tempering the clay much easier to accomplish. Experience has also proved that, by mixing the coal-tar or oil-tar with inferior or weak clays, as strong articles are produced after baking as those made of better or stronger clay. The articles in their green state will also more readily leave the molds and bear handling much better, the oily or tarry matter imparting to them a loamy or unctuous surface, and a considerable degree of toughness and coherence of mass, and also great powers of resisting the action of a damp atmosphere, and even the fall of heavy showers of rain.

We are aware that various combustibles, both solid and liquid, have been introduced into clays for the purpose of themselves burning out when the articles were in process of baking, thus effecting a saving of fuel; but none of them has performed the office of the coal-tar or oil-tar herein described. While the said tars do, to a certain extent, save fuel by their combustion, yet that is not their chief merit. In addition to their service when the bricks are in a green state, when the bricks are being baked, said tars burn and vaporize only at a very high heat, and leave a solid residuum, somewhat like metalliferous ore, in intimate mixture or conglomeration with the baked bricks from their interior to and upon their surfaces, which residuum hardens and toughens the bricks when baked, rendering them able to bear rough transportation without injury.

Care must be taken in the baking or burning of these bricks to raise the fire in the kilns very slowly at first, until all the watery vapor is expelled from the bricks, after which expulsion the fire should be urged as vigorously as possible to a high heat. The bricks, when thus baked, will exhibit the qualities hereinbefore mentioned.

The more highly volatile oils that have heretofore been used in mixture with clays would ruin the bricks intended to be made by this process. Not only would much of the lighter gases of said oils evaporate by atmospheric action before baking commenced, thus securing to the bricks no protection from rain, but as soon as placed in the kiln, and the fires started, and before the watery vapor escaped, the bricks would crumble and be rendered friable, weak, and worthless from the rapid escape of the gas from the oil remaining in the interior of the bricks. It will be observed that no such effects can be produced in our composition, nor by our method of treating the constituents of said composition. It will be advisable in cold weather to warm to a moderate degree the coal-tar or oil-tar, in order to increase its fluidity before mixture with the clay.

Having thus fully described this compound, and its method of preparation and use, as our invention we claim—

The within-described compound or composition of matter, for the manufacture of bricks, tiles, or other articles of pottery-ware, consisting of a mixture of clay and oil-tar, said oil-tar being the liquid residua or distillate of either coal, petroleum, rock, or coal oil, all in the manner and proportions substantially as set forth.

In testimony that we claim the foregoing as our own, we affix our signatures in presence of two witnesses.

PATRICK J. WALSH.
W. J. TAYLOR.

Witnesses:
J. G. MILES,
W. C. ELLIOTT.